United States Patent
Sadowski

(10) Patent No.: US 12,503,073 B2
(45) Date of Patent: Dec. 23, 2025

(54) TRIGGERABLE HOLDING APPARATUS

(71) Applicants: ZF AUTOMOTIVE GERMANY GMBH, Alfdorf (DE); ZF Automotive Systems Poland SP.Z.O.O., Czestochowa (PL)

(72) Inventor: Maciej Sadowski, Czestochowa (PL)

(73) Assignees: ZF AUTOMOTIVE GERMANY GMBH, Alfdorf (DE); ZF AUTOMOTIVE SYSTEMS POLAND SP .Z.O.O., Czestochowa (PL)

( * ) Notice: Subject to any disclaimer, the term of this patent is extended or adjusted under 35 U.S.C. 154(b) by 0 days.

(21) Appl. No.: 18/843,725

(22) PCT Filed: Mar. 3, 2023

(86) PCT No.: PCT/EP2023/055422
§ 371 (c)(1),
(2) Date: Sep. 4, 2024

(87) PCT Pub. No.: WO2023/166169
PCT Pub. Date: Sep. 7, 2023

(65) Prior Publication Data
US 2025/0178558 A1 Jun. 5, 2025

(30) Foreign Application Priority Data
Apr. 3, 2022 (EP) .................... 22160191

(51) Int. Cl.
*B60R 21/2338* (2011.01)
*F42B 3/00* (2006.01)

(52) U.S. Cl.
CPC .......... *B60R 21/2338* (2013.01); *F42B 3/006* (2013.01); *B60R 2021/23384* (2013.01); *B60R 2021/23388* (2013.01)

(58) Field of Classification Search
CPC ...... B60R 21/2338; B60R 2021/23384; B60R 2021/23388; B60R 2021/23382; B60R 2021/23386; F42B 3/006; F42B 3/00
(Continued)

(56) References Cited

U.S. PATENT DOCUMENTS 8,602,453 B1 12/2013 Stevens
11,007,970 B2 * 5/2021 Hiraiwa ................ B60R 21/203
(Continued)

FOREIGN PATENT DOCUMENTS

DE 102005058721 A1 6/2007
DE 102012016858 A1 * 3/2013 ......... B60R 21/2338
(Continued)

OTHER PUBLICATIONS

International Search Report for International Application No. PCT/EP2023/055422 with a mailing date of May 3, 2023, 5 pages.

*Primary Examiner* — Keith J Frisby
(74) *Attorney, Agent, or Firm* — Tarolli, Sundheim, Covell & Tummino LLP

(57) ABSTRACT

The invention relates to a triggerable holding device (10) for a tensioning means (12) of an airbag, comprising a holder (14), a locking member (16) that is movably supported in the holder (14) and that is shiftable between a locking position in which it keeps the tensioning means (12) locked and a release position in which the tensioning means (12) is released, a pyrotechnical device (22) which is coupled to the locking member (16) so that, when the pyrotechnical device (22) is activated, it is shifted from the locking position to the release position, and a restraining device (38) which is tightly connected to the locking member (16) and which, in the release position of the locking member (16), interacts
(Continued)

with a restraining geometry (40) within the holder (14) to hold the locking member (16) in its release position within the holder (14).

11 Claims, 3 Drawing Sheets

(58) Field of Classification Search
USPC .................. 280/743.2; 102/530, 531, 202.14
See application file for complete search history.

(56) References Cited

U.S. PATENT DOCUMENTS

| | | | | |
|---|---|---|---|---|
| 2002/0117840 | A1* | 8/2002 | Dunkle | B60R 21/276 |
| | | | | 280/743.2 |
| 2002/0135166 | A1* | 9/2002 | Thomas | B60R 21/216 |
| | | | | 280/736 |
| 2008/0203716 | A1* | 8/2008 | Parks | B60R 21/2338 |
| | | | | 280/743.2 |
| 2010/0090450 | A1* | 4/2010 | Webber | B60R 21/2338 |
| | | | | 280/736 |
| 2022/0111818 | A1* | 4/2022 | Schneider | B60R 21/2334 |
| 2024/0239296 | A1* | 7/2024 | Kaiser | B60R 21/264 |

FOREIGN PATENT DOCUMENTS

| | | | | |
|---|---|---|---|---|
| DE | 102012007406 A1 | 10/2013 | | |
| DE | 102012023877 A1 | 6/2014 | | |
| DE | 102013014551 A1 * | 3/2015 | ............. | B60R 21/26 |
| WO | 2019141676 A1 | 7/2019 | | |

\* cited by examiner

TRIGGERABLE HOLDING APPARATUS

RELATED APPLICATIONS

This application is a U.S. National Stage Application filed under 35 USC 371 claiming priority to Serial No. PCT/EP2023/055422, filed on 3 Mar. 2023; which claims priority from EP patent application Ser. No. 22/160,191.7, filed 4 Mar. 2022, the entireties of which are hereby incorporated herein by reference.

TECHNICAL FIELD

The invention relates to a triggerable holding device for a tensioning means of an airbag.

BACKGROUND

Airbags are a part of vehicle safety systems. Frequently, a tensioning means is fastened to an airbag. The tensioning means can help control the deployment of the airbag by releasing the tensioning means, for example, after filling the airbag at least partially with a gas. In this way, a desired deployment behavior of the airbag can be achieved.

In addition, the tensioning means can prevent the airbag from deploying excessively in a particular direction in the inflated state. This function is applied, for example, to adaptive airbag concepts or to an active airbag venting.

For releasing the tensioning means triggerable holding devices are known. When the holding device is triggered, for example a locking member is moved out of a locking position in which it keeps the tensioning means locked using a pyrotechnical device. It is a drawback in this context that after triggering the locking member moves uncontrolled in the environment.

Above all in test rigs in which a vehicle safety system is not assembled in the standard vehicle environment, additional safety measures have to be taken so that the locking member is retained on the test rig even after triggering the holding device and cannot cause any damage to adjacent objects such as measuring devices. However, this involves additional efforts.

SUMMARY

Therefore, it is an object of the invention to provide a triggerable holding device for a tensioning means of an airbag in which additional safety measures can be omitted.

According to the invention, this object is achieved by a triggerable holding device for a tensioning means of an airbag, comprising a holder, a locking member that is movably supported in the restraining device and that is shiftable between a locking position in which it keeps the tensioning means locked and a release position in which the tensioning means is released, a pyrotechnical device coupled to the locking member in such a way that it is shifted from the locking position to the release position upon activation of the pyrotechnical device, and a restraining device that is tightly connected to the locking member and that interacts, in the release position of the locking member, with a restraining geometry in the holder so as to hold the locking member in its release position within the holder.

The holding device according to the invention offers the advantage that the locking member cannot detach from the holding device in an uncontrolled manner. Thus, no additional safety measures have to be taken in a test rig.

The pyrotechnical device comprises e.g. a propelling charge and an igniter which includes, in turn, an ignition head and electrical lines.

The locking member is preferably made of metal. In this way, the locking member can take up high transverse forces.

According to one aspect, the restraining device is formed on a base in which the locking member is held, the restraining device projecting laterally from the base. A restraining geometry therefore can be arranged also laterally of the base. This offers the advantage that the restraining geometry is not arranged in the trajectory of the locking member so that assembly of the locking member in the holder is not hindered by the restraining geometry.

Preferably, the base is a plastic member and the plastic forming the base is injection-molded around the locking member in the area of the pyrotechnical device. For example, when manufacturing the base, the locking member is inserted into an appropriate tool mold as an insert and is injection-molded. In this way, the base is held particularly reliably on the locking member. In addition, fewer single parts have to be handled when assembling the holding device.

As an alternative, the locking member can be inserted in the base. In this way, the locking member and the base can be manufactured independently of each other and can be purchased from different suppliers.

The restraining device is a tab, for example, that projects outwardly inclined from the base. The tab thus forms a hook that can get hooked in an appropriate restraining geometry, allowing the locking member to be restrained particularly reliably on the holder.

A free end of the tab points in particular in the direction of the restraining geometry.

According to one variant, the tab is flexible. This is of particular advantage with respect to assembly of the holding device, in particular when the locking member including the base fastened thereto is inserted into the holder. The tab can be pressed inwards a little when the base is inserted into the holder so that a movement of the base is not locked during assembly. In particular, during assembly the tab can be moved over the restraining geometry. If the locking member including the base is in the final position corresponding to the locking position of the locking member, the tab stands up again and, in this state, ensures the locking member to be reliably restrained on the holder.

The base is guided, for example, on an inner wall of the holder, and the inner wall has a recess which extends in the direction of movement of the locking member and into which the restraining device protrudes at least a little. The recess thus forms a clearance in which the restraining device can move unhindered when the holding device is triggered. Thus, the locking member can be moved out of the locking position without the movement being locked initially by the restraining device.

A length of the recess in the direction of movement of the locking member therefore defines a possible displacement path of the locking member from the locking position to the release position.

According to one aspect, the restraining geometry is a cutout extending up to an outer face of the holder, in a release position of the locking member the restraining device being received in the cutout and particularly extending through the cutout. In this way, the restraining device is hooked in the cutout. Such a restraining geometry in combination with a corresponding restraining device is particularly advantageous as, even in the case of an unfavorable tolerance position, the restraining device cannot slip beyond the restraining geometry when the holding device is triggered.

For example, the cutout is axially connected to the recess. That is, the recess is transformed into the cutout. If the restraining device has arrived at the end of the recess, it can thus move directly into the cutout, and the restraining device and the restraining geometry will interact.

In particular, an inlet opening of the cutout opens into the recess and is formed on an end wall of the recess.

The base is preferably guided to be rotationally fixed in the holder. This ensures the restraining device to interact reliably with the restraining geometry.

More precisely, the base is guided in a defined angular position within the holder.

A projection is particularly formed integrally with the base, and on its inner wall the holder includes a groove or a slit in which the projection is guided. In this way, a linear guide is realized.

According to a variant, the holder includes a slit for receiving the tensioning means, the locking member being received in the holder on both sides of the slit. This guarantees stable support of the locking member in the holder allowing, in turn, high transverse forces to be taken up.

BRIEF DESCRIPTION OF THE DRAWINGS

Further advantages and features result from the following description and from the attached drawings which are referred to, and wherein.

DESCRIPTION

Figure 1:
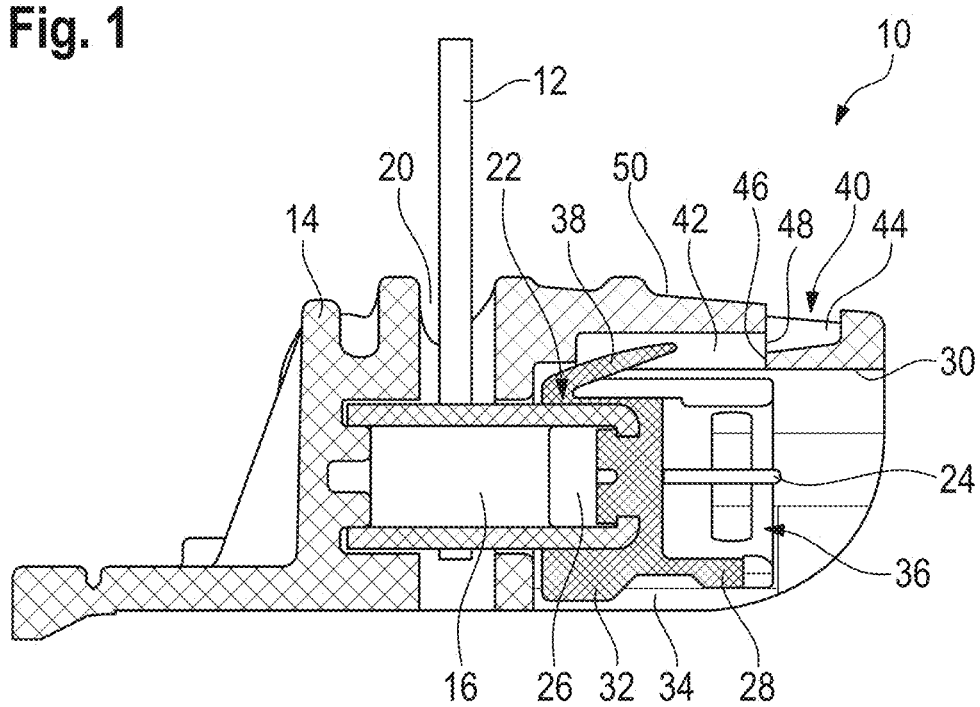
FIG. 1 shows a triggerable holding device according to the invention in the non-triggered state in a sectional view.

FIG. 1 illustrates a triggerable holding device 10 for a tensioning means 12 of an airbag.

Figure 5:
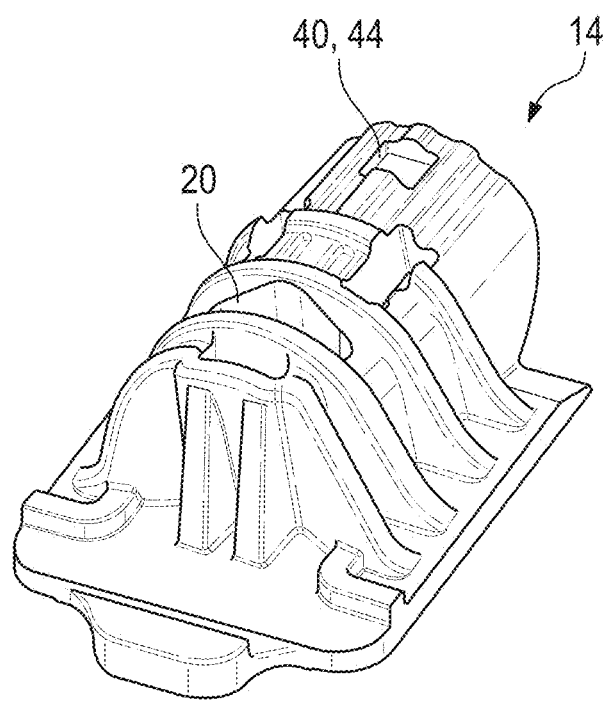
FIG. 5 shows a holder of the holding device.

The holding device 10 comprises a holder 14 that is also shown in FIG. 5. The holder 14 is a plastic injection-molded part, for example.

In the holder 14, a locking member 16 is supported to be movable, specifically linearly displaceable. More precisely, the locking member 16 can be moved from a locking position shown in FIG. 1 to a release position shown in FIG. 2.

In the locking position, the locking member 16 keeps the tensioning means 12 locked.

For this purpose, the tensioning means 12 which is a tether in the embodiment has a loop 18 that is laid around the locking member 16 in the locking position.

The holder 14 includes a slit 20 to receive the tensioning means 12.

The locking member 16 is a sleeve in the embodiment.

Moreover, a pyrotechnical device 22 is provided that is coupled to the locking member 16 so that, when the pyrotechnical device 22 is activated, the locking member 16 is moved out of the locking position to the release position.

The pyrotechnical device 22 comprises in particular electrical lines 24 and an ignition head 26 in which a pyrotechnical propelling charge is accommodated.

The locking member 16 is held in a base 28.

More precisely, the plastic forming the base 28 is injection-molded around the locking member 16 at one end in the area of the pyrotechnical device 22.

In an alternative embodiment not shown in the Figures for convenience, the base 28 is attached to the locking member 16.

The base 28 is guided on an inner wall 30 of the holder 14.

Concretely, the base 28 is guided to be rotationally fixed in the holder 14.

For this purpose, a projection 32 is formed integrally with the base 28 and on its inner wall 30 the holder 14 has a corresponding slit 34 in which the projection 32 is guided. Instead of a slit 34, the holder 14 may include a groove.

The pyrotechnical unit 22 and more precisely the electrical lines 24 are equally partly received in the base 28, the lines 24 extending through the base 28.

The electrical lines 24 are formed by pins, for example.

In addition, a mount 36 for an electrical connection for electrically contacting the lines 24 is formed in the base 28.

The holding device 10 further comprises a restraining device 38 that is tightly connected to the locking member 16.

Concretely, the restraining device 38 is formed integrally in the base 28.

In addition, the holding device 10 comprises a retaining geometry 40 which is formed integrally in the holder 14.

The restraining device 38 and the restraining geometry 40 together form a restraining mechanism.

Figure 3:
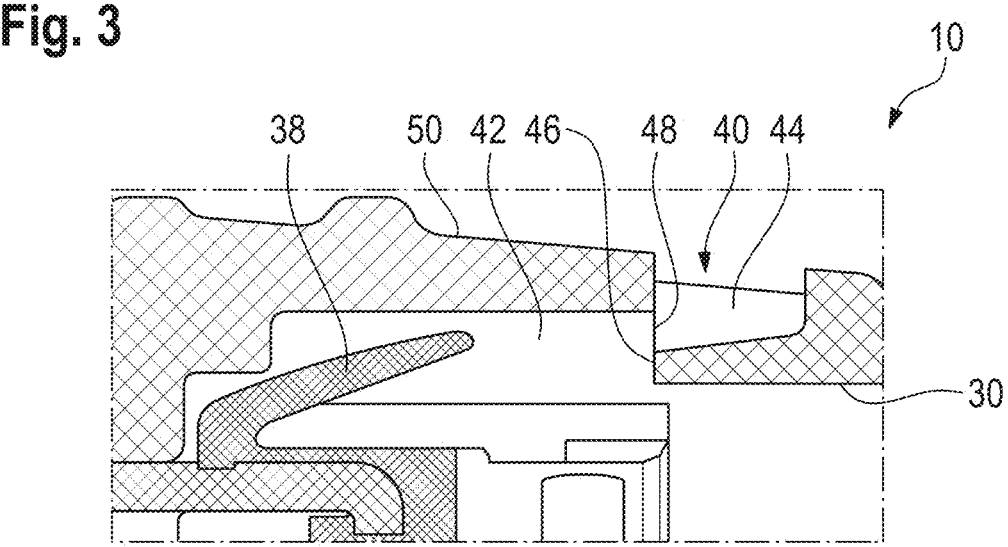
FIG. 3 shows a detail view of a restraining mechanism of the holding device.

FIG. 3 illustrates the holding device 10 in the area of the restraining device 38 and the restraining geometry 40 in a detail view.

The restraining device 38 projects laterally from the base 28.

Figure 4:
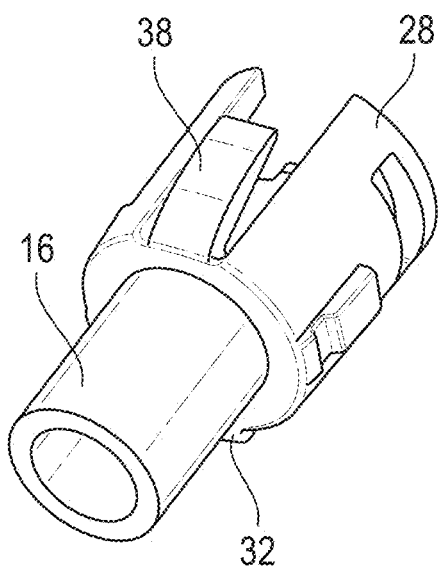
FIG. 4 shows a locking member of the holding device including a base member fastened thereto.

More precisely, the restraining device 38 is a tab that projects outwardly inclined from the base 28. This is particularly clear from FIG. 4 where the locking member 16 including the base 28 is illustrated separately.

The tab is designed to be flexible.

In order to allow the locking member 16 to move from the locking position to the release position, a recess 42 extending in the direction of movement of the locking member 16 is formed on the inner wall 30 of the holder 14.

The restraining device 38 protrudes at least a little into the recess 42.

The restraining geometry 40 is realized by a cutout 44 which is axially connected to the recess 42.

The cutout 44 overlaps the recess 42 in such a way that an opening 48 is formed on an end face 46 of the recess 42.

Starting from the opening 48, the restraining geometry 40, in particular the cutout 44, extends to an outer face 50 of the holder 14.

The cutout 44 does not extend to the inner face 50.

When the holding device 10 is triggered, the locking member 16 is moved out of its locking position generated by the pyrotechnical device 22.

Initially, the locking member 16 can move unhindered, namely as long as the restraining device 38 moves in the recess 42.

When the restraining device 38 impacts the restraining geometry 40, the movement of the locking member 16 is stopped.

Figure 2:
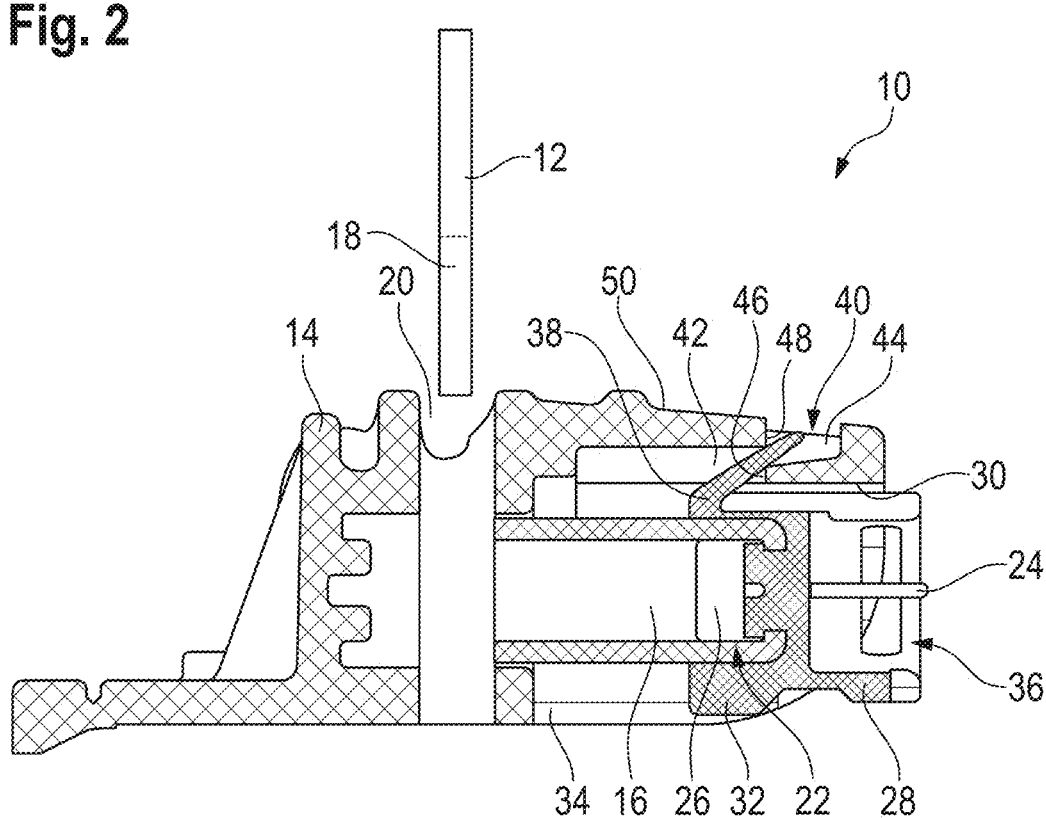
FIG. 2 shows the triggerable holding device of FIG. 1 in the triggered state.

In the release position of the locking member 16, the restraining device 38 interacts with the restraining geometry 40, as illustrated in FIG. 2, so as to lock further movement of the locking member 16 and, thus, to hold the locking member 16 in its release position in the holder 14.

Concretely, the restraining device 38 moves into the cutout 44 of the restraining geometry 40 and gets hooked there, namely in such a way that, in the release position of the locking member 16, the restraining device 38 extends through the cutout 44.

The invention claimed is:

1. A triggerable holding device for a tensioning means of an airbag, comprising
   a holder,
   a locking member that is movably supported in the holder and that is shiftable between a locking position in which it keeps the tensioning means blocked and a release position in which the tensioning means is released,
   a pyrotechnical device that is coupled to the locking member so that, when the pyrotechnical device is activated, it is shifted from the locking position to the release position,
   and a restraining device that is tightly connected to the locking member and that interacts, in the release position of the locking member, with a restraining geometry in the holder to hold the locking member in its release position in the holder, wherein the restraining device is formed on a base in which the locking member is held, the restraining device projecting laterally from the base.

2. The holding device according to claim 1 wherein the base is a plastic member and the plastic forming the base is injection-molded around the locking member in an area of the pyrotechnical device, or the locking member is inserted in the base.

3. The holding device according to claim 1, wherein the restraining device is a tab that projects outwardly inclined on the base.

4. The holding device according to claim 3, wherein the tab is flexible.

5. The holding device according to claim 1, wherein the base is guided on an inner wall of the holder and the inner wall has a recess which extends in a direction of movement of the locking member and into which the restraining device protrudes at least a little.

6. The holding device according to claim 1 wherein the base is guided to be rotationally fixed in the holder.

7. The holding device according to claim 6, wherein a projection is formed integrally with the base and the holder includes, on an inner wall, a groove or a slit in which the projection is guided.

8. The holding device according to claim 1, wherein the restraining geometry is a cutout which extends to an outer face of the holder, wherein the restraining device is received in the release position of the locking member in the cutout.

9. The holding device according to claim 8, wherein the cutout is axially connected to the recess.

10. The holding device according to claim 8, wherein the restraining device, in the release position of the locking member, extends through the cutout.

11. The holding device according to claim 1, wherein the holder includes a slit for receiving the tensioning means.

* * * * *